No. 642,089. Patented Jan. 30, 1900.
A. DEWES & H. A. WHITING.
TIRE.
(Application filed June 9, 1899.)
(No Model.)
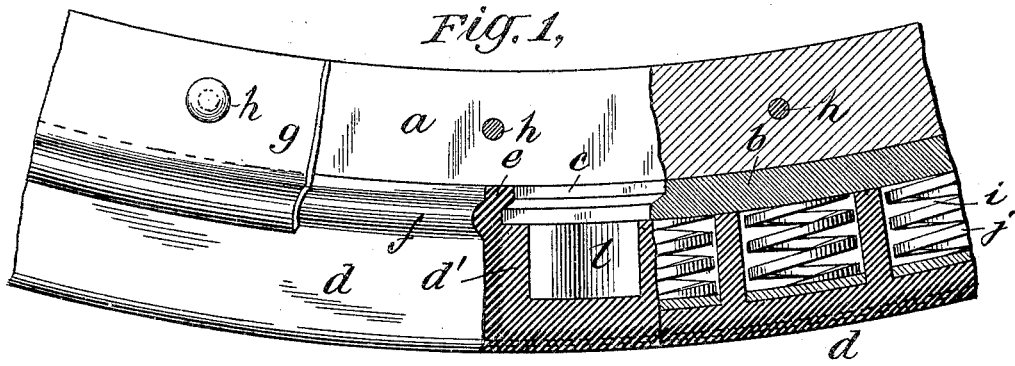
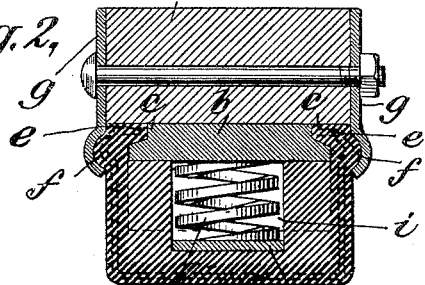
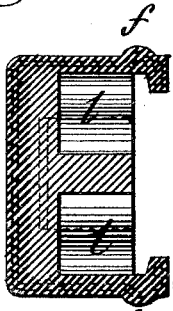
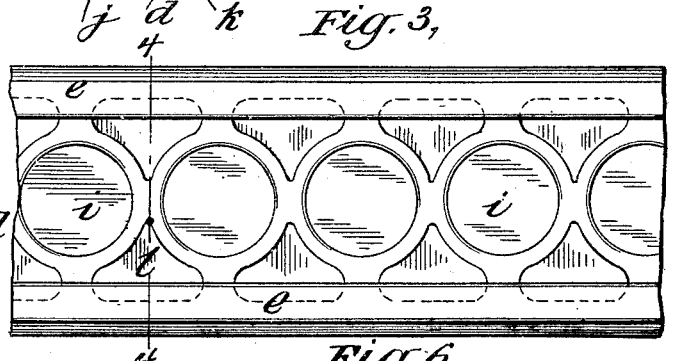
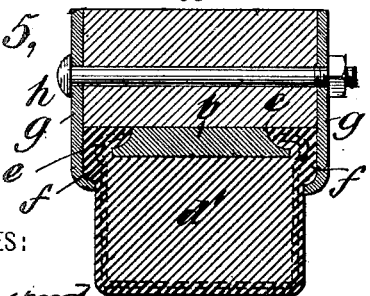
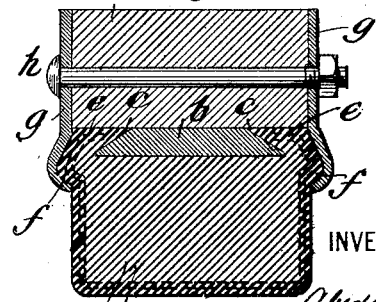
WITNESSES:
INVENTORS
Abednego Dewes
and
Henry A. Whiting
BY Alfred Shedlock
ATTORNEY

UNITED STATES PATENT OFFICE.

ABEDNEGO DEWES AND HENRY A. WHITING, OF NEW YORK, N. Y.

TIRE.

SPECIFICATION forming part of Letters Patent No. 642,089, dated January 30, 1900.

Application filed June 9, 1899. Serial No. 719,894. (No model.)

*To all whom it may concern:*

Be it known that we, ABEDNEGO DEWES, a resident of New York, (Brooklyn,) in the county of Kings, and HENRY A. WHITING, a resident of New York, in the county of New York, State of New York, citizens of the United States, have invented certain new and useful Improvements in Tires, of which the following is a specification.

The improvement in vehicle-wheels forming the subject of this invention comprises a flexible tire extending from the periphery of the felly, a band or felly-tire located on the felly, preferably of less width than the periphery of the felly, and recessed or undercut at its edges, and side plates, as flat rings, secured to the sides of the felly and formed to so embrace the flexible tire as to hold it firmly in position on the felly, said flexible tire being provided with a recess in its inner face corresponding in form to the band on the felly, so that the central part of the flexible tire is in contact with the band or felly-tire and the outer edges of its inner face are in contact with the parts of the periphery of the felly not covered by the band, the recesses at the edges of the band being occupied by portions of the flexible tire, which with the binding action of the clamping-rings on the side of the flexible tire constitute a perfect and secure lock between the flexible tire, the felly, and the band on the felly.

The invention also includes improvements in the construction of the flexible tire, the same consisting in the formation of recesses or pockets in the inner face surrounding cells formed therein which are adapted to hold springs, thereby leaving the walls of said spring-cells of substantially uniform thickness, thus imparting great flexibility to the tire, while each spring partakes of the nature of combined metal and rubber springs. The interior of the tire, constituting the walls of the spring-cells, is preferably made of rubber comparatively soft relatively to the rubber of which the shell or outside part is made, the construction being such that a strong and sufficiently rigid tire is produced having the necessary flexibility.

The accompanying drawings illustrate practical embodiments of our invention and to which we will refer to fully describe the nature and details of our invention.

Figure 1 is a side view of a portion of a wheel-rim, partly in full elevation and showing short longitudinal sections of the various parts. Fig. 2 is a transverse section through one of the spring-cells. Fig. 3 is a view showing the inner side of the flexible tire. Fig. 4 is a transverse section of the same, taken on the lines 4 4; and Figs. 5 and 6 illustrate modifications.

Our improvements are shown applied to the felly $a$ of a wheel, here represented as a wooden felly, which is of the ordinary plain or rectangular form, on which is located in place of the ordinary iron tire a band or metal tire $b$, formed with its edges recessed or undercut, as at $c\ c$, and made somewhat narrower than the width of the felly. The flexible tire $d$ has its inner face grooved to conform to the shape of the band $b$, the parts $e\ e$ being made to fit snugly in the undercuts $c\ c$ of the band when forced therein. Side extensions or beads $f f$ are formed on the side of the tire $d$ opposite the parts of the groove in which the outer edges of the band $b$ lie to strengthen as much as possible these parts of the flexible tire. The retaining-plates are flat rings $g\ g$, clamped to the sides of the felly $a$ by bolts $h\ h$, and are so formed at their outer edges as to embrace the beads $f f$ on the sides of the tire $d$, the parts being so proportioned that said rings $g\ g$ when clamped against the sides of the felly will force the parts $e\ e$ firmly into the undercuts $c\ c$ of the band $b$ and against the parts of the periphery of the felly $a$ not covered by the band, thus insuring a rigid and secure connection between the tire $d$ and the felly and band carried by the felly. This in brief sets forth the essential features of our invention and from which it is seen the flexible tire is in a simple manner firmly secured to the felly, the felly at the same time being perfectly braced and strengthened, and it is apparent that this tire is as well adapted to be applied to old as to new wheels, as no change is made in felly, and is also well adapted for use on ordinary vehicles as well as self-propelled vehicles.

The undercut edges of the band $b$ may be of any suitable form to act as a lock for the parts *e e* of the flexible tire. They may be formed as straight-line flanges, as shown at Figs. 1 and 2, or with curved surfaces, as shown at Fig. 5, or of dovetail form, as shown at Fig. 6. The form of the side extensions or beads *f f* of the flexible tire may be varied without changing their functions. They may be made as distinct beads formed on the sides of the tire a short distance from the inner edge of the tire, as shown at Figs. 1 to 4, or the beads may extend to the corners of the inner face of the tire, as shown at Fig. 6, the widths of the treads of the flexible tires in these two cases being about equal to the widths of the fellies, or the beads *f f* may extend in lines parallel to the side of the tire *d* to the inner face, as shown in Fig. 5, in which case the width of the tread of the tire is somewhat less than the width of the felly.

An examination of the transverse sections Figs. 2, 5, and 6 shows that on each side of the flexible tire there is a double lock—that of the parts *e e* with the undercut edges of the band *b* and that of the beads *f f* with the retaining-rings *g g*—a feature in the construction of the flexible tire being in making the whole of the outer part or shell, including the parts *e e*, of hard resisting material, in which may be embedded canvas or other suitable fabric, so that all parts submitted to wear and contact pressures of the holding parts will withstand all strains, the interior of the tire being made, preferably, of a softer and more elastic material. Another feature is in forming cells *i i* in the inner face of the tire, in which springs *j j* may be placed, acting between the band *b* and plates *k k* at the bottom of the cells, and in forming around these cells recesses or pockets *l l*, leaving the walls of the cells of substantially uniform thickness, so that the soft rubber of which the inner part of the tire is made is free to act in performing the functions of springs in conjunction with the springs *j j*, thus producing a tire that is strong and very flexible or elastic with the minimum amount of rubber used in the manufacture of the tire.

The flexible tires shown in Figs. 5 and 6 are shown as solid tires, the interior in such cases being intended to be of comparatively soft material either of a solid or spongy character when solid tires are used; but such tires may of course be made with cells for use in combination with springs.

We claim as our invention—

1. In a vehicle-wheel, the combination, of a plain-sided felly; a band or felly-tire located on the felly and having its edges recessed or undercut, so that its contacting surface with the felly is less in width than the periphery of the felly; a flexible tire extending wholly beyond the periphery of the felly, formed to embrace the felly-tire and extend into its undercut edges, and seating against the exposed parts of the periphery of the felly; and side rings secured to the sides of the felly and formed to embrace the sides of the flexible tire.

2. In a vehicle-wheel, the combination of a plain-sided felly; a band or felly-tire located on the felly and having its edges recessed or undercut, so that its contacting surface with the felly is less in width that the periphery of the felly; a flexible tire extending wholly beyond the periphery of the felly, formed to embrace the felly-tire and extend into its undercut edges, and seating against the exposed parts of the periphery of the felly and having extensions or beads formed on its sides; and side rings secured to the sides of the felly and formed to embrace said extensions or beads of the flexible tire and to force and hold it in the undercut edges of the band or felly-tire.

3. In a vehicle-wheel, in combination, a plain-sided felly; a band of less width than the felly and fitted on its periphery and having the edges recessed or undercut; a flexible tire formed to seat against the periphery of the band, which is of less width than the periphery of the felly, and the exposed portions of the periphery of the felly and to fit into and fill the undercuts of the band, and having extensions or beads on its sides; and rings secured to the sides of the felly extending beyond its periphery and formed to embrace the beads on the sides of the flexible tire and to force and hold the flexible tire in the undercut edges of the band.

4. In a vehicle-wheel, in combination, a felly; a band of less width than the felly and fitted on its periphery and having its edges recessed or undercut; a flexible tire composed of an interior soft and elastic material and a comparatively hard and resisting exterior, having extensions or beads formed on its sides, said hard and resisting exterior seating against exposed parts of the periphery of the felly and extending into the undercuts of the felly-bands, and the soft interior portions seating against the periphery of the felly-band; and rings secured to the sides of the felly and formed to embrace the beads on the hard exterior sides of the flexible tire and to hold it into the undercuts of the band and against the periphery of the felly.

5. In a vehicle-wheel, in combination, a felly; a flexible tire having spring-cells formed in its inner face and recesses or pockets around said cells so as to leave their walls of substantially uniform thickness; springs located in the cells; and means for securing the tire to the felly.

6. In a vehicle-wheel, in combination, a felly; a flexible tire having a comparatively hard exterior shell and a series of spring-cells of comparatively soft and elastic material, the walls of which are substantially uniform in thickness; springs located in the cells; and means for securing the flexible tire to the felly.

7. In a vehicle-wheel, in combination, a felly; a flexible tire having spring-cells formed in its inner face and recesses or pockets around said cells so as to leave their walls of substantially uniform thickness; springs located in the cells; a band located on the felly and having undercut edges, into which extend portions of the flexible tire; and rings secured to the sides of the felly and formed to embrace the sides of the tire and hold it firmly against the band and periphery of the felly.

Signed at New York, in the county of New York and State of New York, this 2d day of June, A. D. 1899.

ABEDNEGO DEWES.
    HENRY A. WHITING.

Witnesses:
 GEORGE A. GUMBS,
 C. R. CULLINGWORTH.